United States Patent [19]
Pintsov

[11] Patent Number: 4,821,493
[45] Date of Patent: Apr. 18, 1989

[54] METHOD FOR COMPUTERIZED POSTAGE DETERMINATION

[75] Inventor: David A. Pintsov, West Hartford, Conn.

[73] Assignee: Pitney Bowes Inc., Stamford, Conn.

[21] Appl. No.: 161,708

[22] Filed: Feb. 29, 1988

[51] Int. Cl.$^4$ .................. G01G 23/28; B65B 35/50
[52] U.S. Cl. .......................... 53/502; 53/77; 53/154; 53/168; 364/466
[58] Field of Search .............. 53/502, 501, 168, 154, 53/498, 493, 51, 77, 266 A; 177/1, 50, 25; 364/466, 478, 567

[56] References Cited

U.S. PATENT DOCUMENTS

| | | | |
|---|---|---|---|
| 4,077,181 | 3/1978 | Asher et al. | 53/266 A X |
| 4,319,328 | 3/1982 | Eggert | 364/466 |
| 4,366,552 | 12/1982 | Uchimura et al. | 364/466 |
| 4,571,925 | 2/1986 | Adams | 53/502 |
| 4,639,873 | 1/1987 | Baggarly et al. | 364/466 |
| 4,734,865 | 3/1988 | Scullion et al. | 53/266 A X |
| 4,781,013 | 11/1988 | DePasquale et al. | 53/266 A X |

Primary Examiner—James F. Coan
Attorney, Agent, or Firm—Lawrence E. Sklar; David E. Pitchenik; Melvin J. Scolnick

[57] ABSTRACT

In an inserting machine for collating inserts and placing a collation of said inserts into an envelope, a method is disclosed of determining the amount of postage to be applied to said envelope into which said collation of inserts have been inserted. The inserting machine includes a feed deck and a plurality of feed station adapted to selectively feed said inserts onto said feed deck. The method includes (A) feeding along said feed deck a control document having code thereon, (B) reading said code on said control document, (C) storing in data processing memory means a set of predetermined threshold values of a measurable cumulative attribute of said inserts, said threshold values corresponding to the amounts of postage for different postage categories, (D) repeatedly calculating a current attribute value difference (CAVD) between a first threshold value and the attribute values of the inserts being fed onto said feed deck pursuant to said code or other means governing the feeding of inserts onto said feed deck as long as the CAVD remains non-negative until the last desired insert is fed onto said feed deck, and (E) if the CAVD becomes negative, superseding said negative CAVD with a replacement CAVD which is equal to the next higher threshold value less the absolute value of said negative CAVD and repeating step (D), whereby the last desired insert is fed onto said feed deck without exceeding the amount of postage for one of said different postage categories, said amount of postage being the postage required for said envelope and said collation.

3 Claims, 1 Drawing Sheet

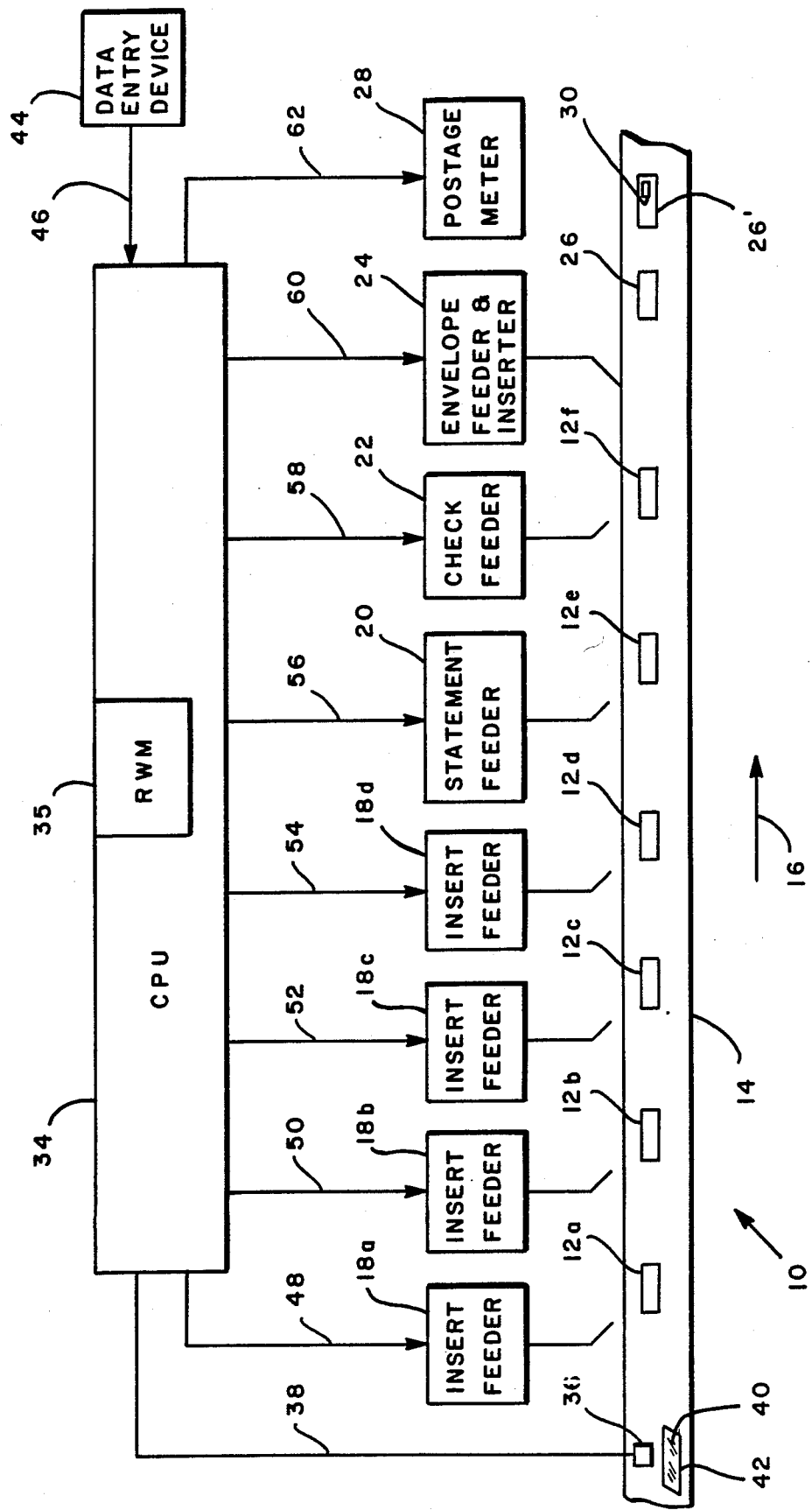

METHOD FOR COMPUTERIZED POSTAGE DETERMINATION

BACKGROUND OF THE INVENTION

The instant invention relates generally to insertion machines and more particularly to such insertion machines having computerized postage determination with or without prioritized selection of inserts to be placed into a mailing envelope.

Insertion machines with multi-feeder stations are widely utilized for mailing applications in which a plurality of different types of enclosures, such as account related documents, advertising enclosures or documents of general or limited interest, are to be included with a customer's monthly statement. Examples of such applications are monthly statements mailed by utilities, credit card companies and banking or other financial institutions. Included typically with the statement are one or more enclosures, or inserts, which may convey a message to the company's customers, such as an offer of additional services, or of a change in company policy, or advertisements provided by third parties for inclusion within the company's monthly mailing. Illustrative of such insertion machines are U.S. Pat. Nos. 3,935,429, and 4,077,181 issued to the assignee of the instant application.

Although current insertion machines are well suited for their intended applications, the evolving requirements of the marketplace now demand insertion machines capable of making last minute decisions regarding which documents or inserts are to be included in a mailpiece and a required amount of postage for the mailpiece.

An application where this capability may prove especially advantageous concerns bank checking accounts wherein a variable number of documents expressive of a customer's monthly statement, a variable number of cancelled checks and possibly one or more inserts of a general or advertising nature are required to be mailed. Due at least statement pages and cancelled checks between customers, the required postage for mailpieces produced will consequently vary over a wide range of postal values. As is well known, the present postage rate categories for first-class letter mail are ultimately based on a final, total weight of a mailpiece. Therefore, any procedure for determining the correct amount of postage for a mailpiece must involve at some point in the procedure a weight-determining step.

Traditionally, such a weight-determining step would comprise weighing the stuffed envelope. As insertion machine throughputs increase, however, this technique of weighing each mailpiece becomes less practical, more complex and hence more expensive for the customer. Furthermore, such a weighing technique does not lend itself to supporting other advancements in insertion machine technology, such as a dynamic selection of inserts based on priority levels and/or the extremely desirable goal of "topping off" a mailpiece with additional inserts to take full advantage of a monetary value of a postage category.

In response to this limitation the prior art has been known to provide an insertion machine wherein the per item weight of the inserts held at a plurality of feeding stations is stored in a data processing memory. A processing means, using the stored per item weights, calculates a total weight based on the number of inserts selectively fed from the feeding stations. This calculated weight is then utilized to determine which one of a plurality of postage meters, each being set to apply postage relating to a different weight category, will be subsequently activated to apply postage to the envelope. Such a machine is disclosed in U.S. Pat. No. 4,571,425 issued Feb. 25, 1986 to Jerryl Adams.

A problem arises in the use of such a system as disclosed in the Adams patent in that the processing means, which is an embedded microprocessor-based processing unit, is required to calculate the total weight of each mailpiece to the variation of the number of in a real-time manner while simultaneously controlling the activation of various feeding stations, postage meters and other machine components. This problem is made especially acute as the number of feeding stations is increased. Inasmuch as modern insertion machines rely on a "pipelined" stream of documents being processed at any given time in order to achieve a high mailpiece throughput, there may be a large number of mailpieces being processed at any given time by the machine. The demands placed upon the processing unit in controlling the operation of the machine and simultaneously calculating the total weights of a plurality of mailpieces may place a limitation on the number of feed stations which the machine may have. In addition, such processing unit demands may result in the throughput of the machine being limited to an economically unjustifiable low rate.

Another problem in the use of such a machine is that the machine, unlike an insertion machine disclosed in copending application Ser. No. 890,677 filed July 30, 1986 for L. Pintsov and entitled "Insertion Machine with Prioritized Selection of Inserts", does not address the desirable goal of optimizing the number of the included inserts in order to achieve the full benefit of the postage category into which the envelope falls Neither does such a machine address the problem of the selection of enclosures for insertion based on criteria other than weight, such as demographic or other characteristics of the addressee.

The foregoing problems are addressed and overcome by the instant invention which provides a method of determining the amount of postage to be applied to an envelope into which a collation of documents have been inserted by an inserting machine having a feed deck and a plurality of feed stations adapted to selectively feed documents onto the feed deck.

SUMMARY OF THE INVENTION

Accordingly, the instant invention provides an inserting machine for collating inserts and placing a collation of said inserts into an envelope and a method of determining the amount of postage to be applied to said envelope into which said collation of inserts have been inserted. The inserting machine includes a feed deck and a plurality of feed stations adapted to selectively feed said inserts onto said feed deck. The method comprises (A) feeding along said feed deck a control document having code thereon, (B) reading said code on said control document, (C) storing in data processing memory means a set of predetermined threshold values of a measurable attribute of said inserts, said threshold values corresponding to the amounts of postage for different postage categories, (D) repeatedly calculating a current attribute value difference (CAVD) between a first threshold value and the attribute values of the inserts being fed onto said feed deck pursuant to said code or other means governing the feeding of inserts onto said feed deck as long as the CAVD remains nonnegative until the last desired insert is fed onto said feed deck, and (E) if the CAVD becomes negative, superseding said negative CAVD with a replacement CAVD which is equal to the next higher threshold value less the absolute value of said negative CAVD and repeating step (D), whereby the last desired insert is fed onto said feed deck without exceeding the amount of postage for one of said different postage categories, said amount of postage being the postage required for said envelope and said collation.

BRIEF DESCRIPTION OF THE DRAWINGS

FIG. 1 is a block diagram of an inserting machine having computerized postage determination capability in accordance with the instant invention.

DESCRIPTION OF THE PREFERRED EMBODIMENT

Referring now to FIG. 1 there is shown a multistation inserting system generally designated 10 adapted for use in a banking application. It should be realized that this is an illustrative embodiment only, and that the apparatus and method of the invention are well suited for use with a variety of different mailing systems including, but not limited to, billing systems, insurance systems and systems adapted for the mass mailing of advertising literature and the like. The use of the invention is also applicable in parcel post mailing systems and also in order filling and mailing systems, wherein a mailpiece comprises items of diverse intrinsic postal cost. The inserting system 10 operates to feed inserts (documents) from a plurality of insert feeders 18 and onto a transport deck 14, the inserts being collated as they are conveyed downstream on the deck 14 to an envelope feeder and insertion station 24 where the collated inserts are inserted within an envelope 26. Thereafter the envelope 26 is sealed and conveyed to a postage meter 28 where a required amount of postage is applied. The system 10 is operable for reading a machine readable code, in the form of a data key or token, provided on a control document which is conveyed upon the deck 14, the key being indicative of, among other things, the priority of inserts held in the insert feeders 18 and which are available to be included within a particular envelope 26. Controlling the operation of the feeders 18 $a$–$d$ is a central processing unit (CPU) 34, which is also operable for determining a required amount of postage for each stuffed envelope 26 and for providing, by a suitable communications means, the postage information to the postage meter 28. The meter 28 comprises a printing means, such as an ink jet printer or a printing die, operable for printing a proof of postage, such as a postage indicia, indicative of the required postage amount, upon each successive stuffed envelope 26. Such a postage indicia may take the form of a graphical pattern or bar code or some other type of approved pattern for representing the monetary amount of the postage and other information, such as the postage meter serial number, the date, etc.

As may be seen more specifically in FIG. 1, a plurality of document collations 12$a$ through 12$f$ are disposed upon the surface of the transport deck 14 and are transported thereon in a direction indicated by the arrow 16. Each of the collations 12$a$ through 12$f$ may comprise a different number of documents and document types, the document types being inserts, or enclosures, fed from a plurality of document entry devices, such as the insert feeders 18 $a$–$d$. The collations 12 $a$–$f$ will also generally comprise documents fed from multiple document entry devices such as a statement having one or more pages fed from a statement feeder 20, and a plurality of bank checks fed from check feeder 22. As may be appreciated, collation 12$a$ will generally comprise one or more inserts fed from feeder 18$a$, while collation 12$b$ may comprise two or more inserts fed from feeder 18$a$ and feeder 18$b$. Collation 12$c$ may comprise three or more inserts, and so on.

Collation 12$f$, also referred to herein as a final collation, comprises a bank statement having one or more pages fed from feeder 20 and some variable number of checks fed from feeder 22. In addition, collation 12$f$ may comprise one or more inserts fed from feeders 18$a$ through 18$d$. Final collation 12$f$ is transported to an envelope feeder and inserter 24, where it is inserted into an envelope 26. The operation of the inserter 24 subsequently seals the stuffed envelope, or mailpiece, 26 which is thereafter conveyed to a postage printing device such as postage meter 28 to have a postage indicia 30 applied thereto. The postage metered envelope 26 will thereafter be transported to other, unillustrated downstream apparatus where it may be sorted according to zip code and stacked for mailing.

Control of the operation of system 10 is provided by the central processing unit (CPU) 34 which may be a computer or a microcomputer. CPU 34 has a plurality of inputs and outputs (only some of which are shown in FIG. 1) for inputting document related data and for controlling the various document feeders 18, 20 and 22, the inserter 24 and the postage meter 28. Associated with CPU 34 is a read/write memory (RWM) 35 which is operable to have data written within and subsequently read by CPU 34. RWM 35 may comprise static or dynamic RAM semiconductors, magnetic disk, CCD serial type memory, or any suitable semiconductor or magnetic memory. The manner of interconnection of the RWM 35 and the CPU 34, via address, data and control signal lines, is well known in the art.

As also seen in FIG. 1, there is coupled to CPU 34 a document token reading device in the form of an optical sensor 36 having an output 38. The sensor 36 is disposed relative to deck 14 such that it may sense a token, or data key, 40 provided on a control document 42, the key 40 being read by CPU 34 via output 38. Typically, one such control document 42 is provided for each customer mailpiece, the key 40 being indicative of, for example, the number of returned checks to be fed by feeder 22 and also which inserts contained in feeders 18$a$ through 18$d$ are to be included in the final collation 12$f$. As may be appreciated, in other embodiments of the invention such information may be provided to CPU 34 in a variety of different ways, such as by magnetic coding or by a direct communications link to a control document preparation source, such as an electronic data processing (EDP) computer (not shown).

The information may also be provided via a magnetic tape or disk obtained from the control document preparation source. It should be realized that the key 40, in a banking application for example, may be provided upon each customer's statement, typically upon the first, or address bearing page of the statement. If this is the case, the statement feeder 20 would be positioned such that it would be the first feed station upon the transport deck 14, assuming the position shown as insert feeder 18$a$ in FIG. 1. Sensor 36 would be disposed relative to feeder 20 such that it would sense the key 40 upon a statement page fed by feeder 20.

There may also be connected as an input to CPU 34 by way of a suitable cable 46 a data entry device 44, which may be an operator actuated keyboard or a separate EDP system and functions in general to enter system control data and the like into the CPU 34.

In addition to the above described inputs, CPU 34 has a plurality of output lines 48, 50, 52, 54, 56, 58, 60 and 62 suitable for controlling the activation of the insert feeders 18 $a$–$d$, the statement feeder 20, the check feeder 22, the inserter 24 and the postage meter 28. For example, line 62 may be a serial data communications link operable for transmitting information expressive of a required value of postage to be applied by meter 28.

The amount of postage to be applied to the stuffed envelope 26 is determined by the following calculations which are executed by the CPU 34. Although the following embodiment utilizes the weight of the insert as the attribute upon which the postage determining calculations are based, it is possible to use other cumulative attributes of the inserts, such as thickness. In the stream of inserts to be collated into the final collation 12$f$, each of the inserts is assigned a priority (a, b, c, etc., in the order of descending importance) level. The various postage categories for U.S. Postal Service first class mail are broken down in one ounce denominations, so that the thresholds for given amounts of postage are one ounce, two ounces, three ounces, etc. Presently, the amounts of postage are $0.22 for one ounce, $ 0.35 for two ounces, $0.56 for three ounces, etc. The threshold weights corresponding to the amounts of postage for the different postage categories are stored in the CPU 34; presently, $W_1 = 1$ oz., $W_2 = 2$ oz., etc., corresponding to $P_1 = \$0.22$, $P_2 = \$ 0.39$, etc.

In operation, the first upstream insert of priority level a (highest) is selected and the weight of this insert $W_a$ is subtracted from the weight threshold selected by the operator of the system 10 which is not to be exceeded, this threshold being designated $W_1$, which could be one or two ounces, or any desired threshold weight. If the obtained difference is positive, the next insert of priority a downstream is selected and its weight is subtracted from the first obtained difference, and so on. Every time a subtraction is made, the difference is stored under the name of current weight difference (CWD) in a specially reserved location of the memory of the CPU 34. If, after subtracting from the CWD the weight of the last (downstream) insert of priority a, that difference is still positive, then depending on the meaning of the priority b inserts, one can either proceed in the same manner with the priority b inserts until the CWD becomes negative, in which case the postage calculated is assigned the value $P_1$ (and the last insert of priority b making the CWD negative is not added to the collation), or the postage calculated is assigned the value $P_2$ and one proceeds in the same manner with the priority b and c inserts.

In the foregoing embodiment, the attribute of the inserts which was utilized to determine postage was weight; but it should be noted that any measurable cumulative attribute of the inserts may be utilized, and the calculations would proceed as described with respect to weight.

It is to be understood that the present invention is not limited to the specific embodiment disclosed herein which merely exemplifies the principles of the invention, and is the best mode presently contemplated for carrying out the invention and is susceptible to change in form, size and detail and arrangement of parts. The present invention is intended to cover all such modifications, variations and equivalents thereof as may be deemed to be within the scope of the claims appended hereto.

What is claimed is:

1. In an inserting machine for collating inserts and placing a collation of said inserts into an envelope, a method of determining the amount of postage to be applied to said envelope into which said collation of inserts have been inserted, said inserting machine having a feed deck and a plurality of feed stations adapted to selectively feed said inserts onto said feed deck, said method comprising:

A. feeding along said feed deck a control document having code thereon;

B. reading said code on said control document;

C. storing in data processing memory means a set of predetermined threshold values of a measurable, cumulative attribute of said inserts, said threshold values corresponding to the amounts of postage for different postage categories;

D. repeatedly calculating a current attribute value difference (CAVD) between a first threshold value and the attribute values of the inserts being fed onto said feed deck pursuant to said code or other means governing the feeding of inserts onto said feed deck as long as the CAVD remains non-negative until the last desired insert is fed onto said feed deck; and E. if the CAVD becomes negative, superseding said negative CAVD with a replacement CAVD which is equal to the next higher threshold value less the absolute value of said negative CAVD and repeating step (D), whereby the last desired insert is fed onto said feed deck without exceeding the amount of postage for one of said different postage categories, said amount of postage being the postage required for said envelope and said collation.

2. The method of claim 1 wherein said attribute comprises weight.

3. The method of claim 2, wherein said code includes an indication of the priority of said inserts to be included in said collation.

* * * * *